United States Patent [19]

Miller et al.

[11] Patent Number: 4,510,680

[45] Date of Patent: Apr. 16, 1985

[54] METHOD OF MAKING A PERMANENT MAGNET ROTOR

[75] Inventors: Timothy J. E. Miller, Schenectady; Donald W. Jones, Burnt Hills; Gary L. Kalan, Clifton Park, all of N.Y.

[73] Assignee: General Electric Company, Schenectady, N.Y.

[21] Appl. No.: 558,211

[22] Filed: Dec. 5, 1983

Related U.S. Application Data

[62] Division of Ser. No. 453,666, Dec. 27, 1982, Pat. No. 4,480,207.

[51] Int. Cl.³ ............................................. H02K 15/02
[52] U.S. Cl. ........................................ 29/598; 310/42; 310/156
[58] Field of Search .................. 29/598, 596; 310/156, 310/261-265, 42

[56] References Cited

U.S. PATENT DOCUMENTS

| | | | |
|---|---|---|---|
| 2,985,779 | 5/1961 | Flanigan et al. | 310/156 |
| 3,492,520 | 1/1970 | Yates | 310/156 X |
| 3,567,974 | 3/1971 | Spingler | 310/156 X |
| 3,840,763 | 10/1974 | Baumann et al. | 310/156 |
| 4,117,360 | 9/1978 | Richter | 310/183 |
| 4,139,790 | 2/1979 | Steen | 310/156 |
| 4,358,697 | 11/1982 | Liv et al. | 310/156 |

*Primary Examiner*—Carl E. Hall
*Attorney, Agent, or Firm*—Mark L. Mollon; James C. Davis, Jr.; Marvin Snyder

[57] ABSTRACT

A permanent magnet rotor has a north and a south pole piece each separated into two sections by a central nonmagnetic insert to reduce the quadrature flux. The pole piece sections are welded to the central nonmagnetic insert, two nonmagnetic segments are welded to either end of the north pole piece and two magnetic segments are welded to either end of the south pole pieces to form two half rings. The half rings are secured about a solid shaft of magnetic material having a central portion with a rhombic cross section. The centerline of the half rings is aligned with the diagonal of the square central portion. The half rings are bolted to one another. The sides of the shaft and the inner faces of the half rings form four apertures extending the axial length of the pole pieces. A magnet which adds no structural strength to the rotor is positioned in each of the apertures, respectively. Two of the magnets have their north seeking face adjacent the north pole piece and two of the magnets have their south seeking face adjacent the south pole piece, forming a two pole rotor.

6 Claims, 2 Drawing Figures

METHOD OF MAKING A PERMANENT MAGNET ROTOR

This application is a division, of application Ser. No. 453,666, filed 12/27/82, now U.S. Pat. No. 4,480,207.

BACKGROUND OF THE INVENTION

This invention relates to permanent magnet dynamoelectric machines and more specifically to high speed permanent magnet dynamoelectric machines with the permanent magnets located in the interior of the rotor.

Electric generators of alternating current are sometimes excited or magnetized by means of permanent magnets because this leads to machines of simple, robust construction having high efficiency and being free of slip rings or commutators.

It is important to obtain a sufficiently strong magnetic field in the air gap of the machine, using permanent magnets whose optimum field strength is the field strength required in the air gap. Optimum field strength is the field strength in the magnet which maximizes the stored magnetic energy per unit volume in the magnet and which therefore leads to a design in which magnet volume, weight and cost are minimized.

In addition to obtaining optimum field strength, there is a need for adequate mechanical support of the permanent magnets located in the interior of the rotor. The magnets, as well as the surrounding structures, are subjected to various systems of forces arising from thermal expansion, rotation and residual forces from the manufacturing process, such as distortions from welding.

In previous high peripheral speed permanent magnet rotor designs such as the one shown in Richter U.S. Pat. No. 4,117,360, issued Sept. 26, 1978, and assigned to the instant assignee, a composite shrink ring of magnetic and nonmagnetic pieces welded together is used to hold the magnets and the remaining rotor assembly. The pole pieces in the rotor assembly are solid pieces of magnetic material.

It is an object of the present invention to provide a rotor for a permanent magnet machine in which the magnets are not required to contribute structural strength to the rotor.

It is a further object of the present invention to provide a rotor for a permanent magnet machine in which the magnets may be easily inserted in the magnetized condition.

It is a still further object of the present invention to provide a rotor for a permanent magnet machine in which high precision assembly is achieved with minimum distortion from welding or brazing.

It is another object to provide a rotor for a permanent magnet machine which is capable of rapid disassembly and reassembly without damage.

It is yet another object of the present invention to provide a rotor for a permanent magnet machine which is suitable for manufacturing large diameter high speed machines (diameter up to about 15 inches at 3600 rpm).

It is a still further object of the present invention to provide a rotor with laminated pole pieces for a permanent magnet machine, which is suitable for use in large diameter high speed machines.

SUMMARY OF THE INVENTION

In one aspect of the present invention a rotor for a permanent magnet machine is provided having a north and a south arcuately shaped pole piece. Two nonmagnetic segments are secured, respectively, to either end of the north pole piece forming a half ring and two nonmagnetic segments are secured, respectively, to either end of the south pole piece forming another half ring. The half rings are secured about a shaft of magnetic material having a central portion of substantially rhombic cross section. The centerline of the half rings is aligned with the diagonal of the square central portion of the shaft. The sides of the shaft and the inner faces of the half rings form four apertures extending the axial length of the pole pieces. Magnets are positioned in each of the apertures. Two of the magnets have their north seeking face adjacent the north pole piece and two of the magnets have their south seeking face adjacent the south pole piece. The magnets are secured in the respective apertures.

In another aspect of the present invention a method of fabricating a rotor for a permanent magnet machine is set forth in which a central nonmagnetic insert is rigidly secured between two arcuately shaped sections of a north pole piece and a central nonmagnetic insert is rigidly secured between two arcuately shaped sections of a south pole piece. A nonmagnetic segment is rigidly secured to the end of each of the north and south pole piece segments not secured to the central inserts to form two half rings, each ring having a nonmagnetic segment, pole piece section, central insert, pole piece section and a nonmagnetic segment. The two half rings surround the central portion of a shaft of magnetic material. The central portion of the shaft is of substantially rhombic cross section. One corner of the shaft central portion is adjacent one central nonmagnetic insert and the diagonally opposite corner of the shaft central portion is adjacent the other central nonmagnetic insert. The clearance between the shaft and the central inserts and the clearance between adjacent nonmagnetic segments are all adjusted to a predetermined value by machining or shimming the junction of the nonmagnetic segments. The ring halves are fastened together and the central inserts are fastened to the shaft. Magnetized permanent magnets are slid into axially extending apertures formed between the shaft faces and inner faces of the half rings. The magnets are secured in their apertures by end rings at both axial ends of the pole pieces.

DESCRIPTION OF THE DRAWING

While the specification concludes with claims particularly pointing out and distinctly claiming the present invention, the objects and advantages of the invention can be more readily ascertained from the following description of a preferred embodiment when used in conjunction with the accompanying drawing in which:

DETAILED DESCRIPTION OF THE PREFERRED EMBODIMENT

Figure 1:
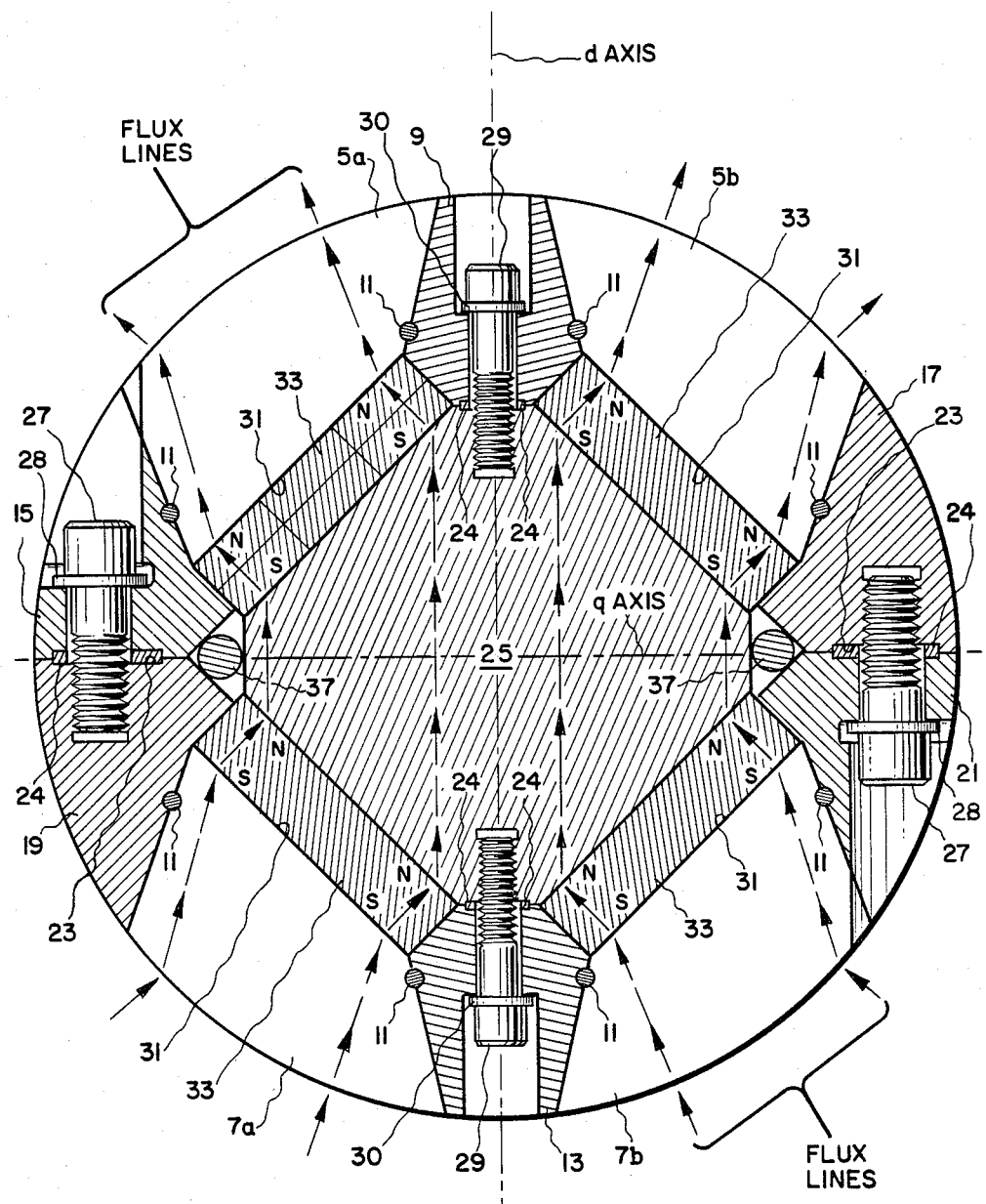
FIG. 1 is a sectional view of a permanent magnet rotor in accordance with the present invention.

Referring now to FIG. 1 of the drawing there is shown a two pole permanent magnet machine suitable for use as a rotor for a motor or a generator. The rotor is a two pole machine since the pole polarity changes direction only twice in one traversal of the rotor circumference. The rotor has an arcuately shaped north pole piece comprised of two sections 5a and 5b, and an arcuately shaped south pole piece comprised of two sections 7a and 7b. The pole piece sections are made up of a stack of laminated magnetic steel sheets. The plane of the laminations is parallel to the section along lines 1—1 in FIG. 2. The laminations of the pole pieces are insulated from one another to minimize power losses and heating caused by tooth-ripple flux pulsations. The laminations can be insulated from one another by magnetic oxide formed, for example, by steam bluing. The north pole piece sections 5a and 5b are completely separated by and secured to a flux barrier shown as a central nonmagnetic insert 9. One end of each of the laminated pole pieces 5a and 5b is preferably electron beam welded to the central nonmagnetic insert which can be a solid piece of austenitic stainless steel. The laminated pole pieces can be secured to the nonmagnetic insert by other methods such as brazing. Electron beam weld stops 11 of low carbon steel are used to control the depth of the electron beam weld and reduce stresses caused by the end of a weld by providing an increased radius of curvature at the end of the weld. For additional details concerning the use of electron beam weld stops reference should be made to Jones and Miller copending application "Method of Electron Beam Welding", Ser. No. 453,664 filed 12-27-82, filed concurrently herewith and assigned to the same assignee as the present invention and hereby incorporated by reference. Similarly, one end of each of the south pole piece sections 7a and 7b is preferably electron beam welded to a central insert 13.

Secured, preferably by electron beam welding, to the other end of each of the pole piece sections 5a, 5b, 7a and 7b are nonmagnetic segments or cheek pieces 15, 17, 19, and 21, respectively. Elements 15, 5a, 9, 5b and 17 and elements 19, 7a, 13, 7b and 21 each form a half ring, respectively. The two half rings are positioned above and below the central portion of a solid magnetic steel shaft 25 of substantially rhombic cross section. The shaft shown in the preferred embodiment of FIG. 1 is substantially square shaped in cross section with one corner adjacent the central nonmagnetic insert 9 and an opposite corner adjacent central nonmagnetic insert 13. The ring halves are secured to one another along a horizontal center line preferably using bolts 27 with washers 28 which pass through an aperture drilled in one segment which communicates with a threaded hole in the adjacent segment. The bolts 27 extend across the rotor center line between the ring halves. Segments 15 and 19 are bolted to one another and segments 17 and 21 are bolted to one another with bolts positioned along the axial length of the stack.

To provide fixed lateral alignment between the two halves of the ring, keyways 23 and keys 24 are provided in adjacent segments 15 and 19, and 17 and 21 and between the rotor 25 and segments 9 and 13. The keys can be configured of a strip of material having apertures for the bolts. Alternatively, it is possible to provide fixed lateral alignment using rabbets.

Figure 2:
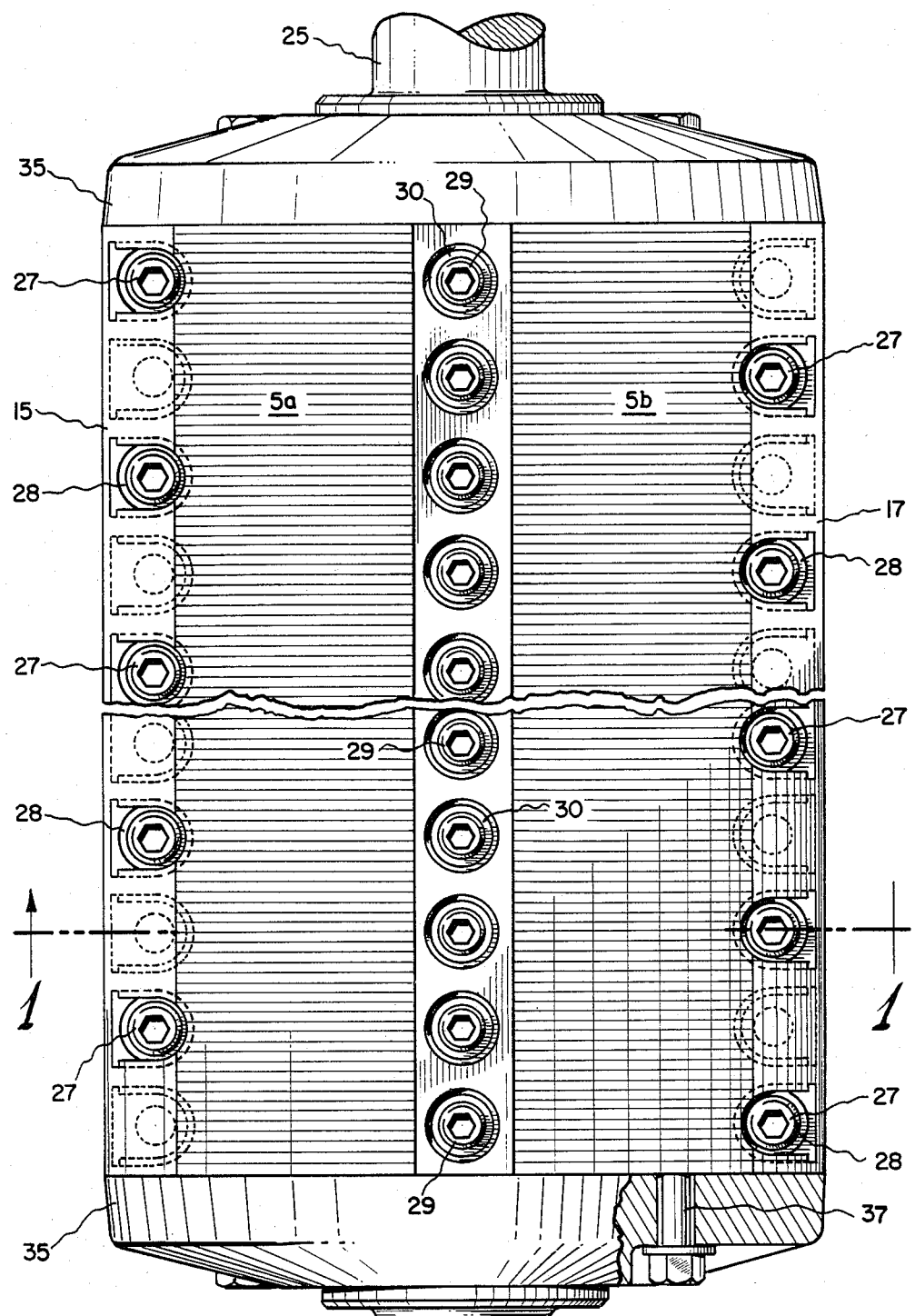
FIG. 2 is a side view of a permanent magnet rotor in accordance with the present invention, showing lines 1—1 along which the sectional view of FIG. 1 is taken.

The central inserts 9 and 13 are secured to the shaft by bolts 29 with washers 30 which pass through a recessed hole in each insert to a threaded hole in the shaft. Bolts are positioned along the axial length of the rotor stack length as can be seen in FIG. 2. Referring again to FIG. 1, the major flat sides of the substantially square central portion of the solid rotor 25 and the half rings comprising elements 15, 5a, 9, 5b, and 17, and elements 19, 7a, 13, 7b and 21 define four rectangular slots 31 which extend the axial length of the stack. Permanent magnets 33 are positioned in the slots. The magnet positioned in each slot can be made up of smaller magnets epoxied together. The magnets adjacent to north pole piece sections 5a and 5b have their north seeking sides adjacent to the north pole pieces. Similarly, the magnets 33 adjacent to the south pole piece sections 7a and 7b have their south seeking faces adjacent the south pole piece sections.

Referring now to FIG. 2, a ring of nonmagnetic material 35 such as austenitic stainless steel or aluminum is positioned about the round end portions of shaft 25 and secured to the stack by tie bolts 37 extending through the stack in an aperture visible in FIG. 1, between the rotor and the nonmagnetic segments 15 and 19 and the rotor and nonmagnetic segments 17 and 21 to retain the magnets in their slots. Fan blades (not shown) for cooling purposes can be added to the rings 35, shown in FIG. 2, by casting the fins and rings of aluminum in one piece.

A method of fabricating the rotor comprises the fabricating the two half rings shown in FIG. 1, by welding the two sections of the north pole piece 5a and 5b to the central nonmagnetic insert 9 and welding the cheek pieces 15 and 17 to the pole sections 5a and 5b to form a half ring, and welding the two sections of the south pole piece 7a and 7b to the central nonmagnetic insert 13 and welding the cheek pieces 19 and 21 to the pole sections 7a and 7b to form another half ring. The half rings are positioned above and below the substantially square central portion of a solid magnetic steel shaft. One corner of the shaft 25 is adjacent central nonmagnetic insert 9, the opposite corner of the shaft is adjacent central nonmagnetic insert 13. Next, the clearance between the shaft and central nonmagnetic inserts is measured to check for zero clearance. Then the clearance between cheek pieces 15 and 19 and 17 and 21 is measured. The clearance between the cheek pieces is adjusted by machining or shimming, as appropriate, until a predetermined clearance, (0.000 to 0.002 inches, for example, for a 15 inch diameter machine) between cheek pieces and zero clearance between the rotor and the central nonmagnetic inserts is achieved. Bolts 27 are then used to secure the upper and lower rings by bolting the adjacent cheek pieces to one another, tightening the bolts to a high torque, typically 85% of their yield strength. The central inserts are fastened to the rotor by using bolts 29 extending through the central inserts and threaded to the shaft, tightened to a high torque, typically 85% of their yield strength. The major sides of the substantially square shaft and the half rings define rectangular slots 31 into which magnetized permanent magnets 33 are slid. End rings 35 (shown in FIG. 2) are then secured to the rotor to hold the magnets in place. The entire rotor can be vacuum pressure impregnated using an epoxy compound if desired.

The method of assembling the permanent magnet rotor results in distributing the loads during operation (mainly centrifugal forces) to relieve the magnets of all structural functions and to achieve a defined share of the total load on each of the bolts. The bolts 27 through the nonmagnetic segments provide hoop strength to the ring and the bolts 29 through the central inserts to the rotor prevent deflections of the ring from the shaft during operation. The welding together of the pole pieces and the nonmagnetic segments provides a rigid structure which does not rely on the magnets for structural support. The optimum load distribution among the bolts is achieved by properly distributing assembly clearances. One way is to have zero clearance between the nonmagnetic segments and the shaft and the central inserts prior to tightening the bolts. The maximum centrifugal load on the bolts 29 holding the central inserts to the shaft will then be the load that will just close up the space that would occur if only bolts 27 were in place and the rotor spun at operating speed. This ensures that bolts 27 carry most of the centrifugal load. Bolts 27 are sized so as to be capable of carrying the entire load, and will do so if the actual manufacturing tolerances turn out to be such that the bolts 29 never take up any load as the rotational speed increases. This situation occurs when the maximum allowed clearance of 0.002 inches occurs between the nonmagnetic segments prior to tightening the bolts. Since the two half rings are fabricated first, it is possible to set the clearance between adjacent cheek pieces very accurately by grinding and shimming. This avoids the problems of having these clearances subject to thermal distortion due to welding (even though this is minimal with electron beam welding).

In rotor operation, the rotor is positioned in the bore of a stator (not shown). The stator configuration is essentially the same as that for a three-phase induction motor stator for three-phase operation. The rotor and stator are assembled with a narrow air gap between the exterior radial surface of the rotor and the interior surface of the stator (typically $\frac{1}{8}$"). The air gap is somewhat larger than the air gap of an induction motor but smaller than that in the normal synchronous machine with wound rotor. Rotation of a 15" rotor in a stator at 3600 rpm generates an open circuit voltage at 60 hertz of 620 volts line-to-line which exceeds the full load voltage of 460 volts line-to-line rms. A few typical lines of flux are shown by dashed lines in FIG. 1. Optimum field strength in the preferred embodiment is achieved with a flux concentration (ratio of magnet pole area to rotor pole area at the rotor surface) of less than one. Flux concentration is achieved by orienting the magnet pole faces obliquely to the desired direction of magnetic flux. The ratio of magnet area to pole area has been chosen to be the highest value which is consistent with manufacturing and structural constraints to maximize the stored magnetic energy per unit volume in the magnet. Because of the flux concentration arrangement the total pole area of the magnet is a large fraction of the pole area at the rotor surface, so that the flux density in the air gap between the rotor and stator (not shown) is not much less than the flux density in the magnets themselves. Each flux line passes through two magnet blocks 33 in series, which illustrates the fact that the total magnet length in the direction of magnetization is twice the length of one magnet block. The total width of a magnet pole communicating flux to one pole at the rotor surface is twice the width of one block. The width of a block 33 shown in FIG. 1, is about four times its length, as is typical with high-energy magnets with high coercivity (such as samarium cobalt or other rare-earth-/cobalt magnets).

Each pole piece in FIG. 1 is shown with a nonmagnetic "flux barrier" between the sections formed by the nonmagnetic central inserts 9 and 13 already described. This barrier greatly reduces the flux traversing the rotor in a direction generally parallel to the quadrature or "q" axis by providing a high reluctance (low permeance) path in the quadrature direction across the pole piece sections. The direct or "d" axis and quadrature or "q" axis are shown in FIG. 1. The quadrature axis is defined as the axis that represents the direction of the radial plane along which the permanent magnets produce no magnetization, which normally coincides with the radial plane midway between adjacent poles. The direct axis is defined as the axis representing the direction of the plane of symmetry of the no-load magnetic-flux density, produced by the permanent magnets, normally coinciding with the radial plane of symmetry of a field pole. The quadrature or "cross pole" flux, if not greatly reduced by the central inserts 9 and 13, could otherwise lead to a reduction in the electrical capability of a machine using the rotor of the present invention and operating as a generator. More specifically the reduction of the quadrature flux reduces the quadrature axis component of the reactance. The flux barrier also reduces the air gap flux density in the center of the pole piece which reduces the direct axis component of the reactance. The reduction in reactance and in the associated voltage drop makes the terminal voltage of a generator using the rotor of the present invention relatively independent of load current. This results in a generator in which rated voltage is easier to maintain at different operating conditions. Although the flux barrier also slightly reduces the open circuit voltage of the generator, this effect is outweighed by the decrease in direct axis component of reactance and by the substantially (typically a factor of 3) reduction of quadrature axis component of reactance. The angle between the open circuit phasor voltage and the terminal voltage phasor is reduced when the reactance is reduced, which results in a more easily controlled or stable generator. The central inserts 9 and 13 because they are nonmagnetic also prevent a magnetic short circuit path between the north and south faces of each of the magnets 33.

The foregoing describes a rotor for a permanent magnet machine and a method of fabricating the same that does not require the magnets to contribute structural strength to the rotor. The rotor is capable of high precision assembly with minimum thermal distortion from welding or brazing and may be rapidly disassembled and reassembled without damage. Large diameter high speed motors and generators can be manufactured using the rotor and method of fabricating described.

While the invention has been particularly shown and described with reference to a preferred embodiment thereof, it will be understood by those skilled in the art that various changes in form and detail may be made without departing from the spirit and scope of the invention.

What is claimed is:

1. A method of assembling a permanent magnet rotor comprising the steps of:
   rigidily securing a central nonmagnetic insert between two arcuately shaped sections of a north pole piece;
   rigidly securing another central nonmagnetic insert between two arcuately shaped sections of a south pole piece;
   rigidly securing a nonmagnetic segment to each end of each of said north and south pole piece sections not secured to said central inserts, respectively, to form two half rings;
   surrounding the central portion of a shaft of magnetic material with the two half rings, the central portion of the shaft having a substantially rhombic cross section, one corner of said substantially rhombic shaped shaft central portion adjacent one central nonmagnetic insert and the diagonally opposite corner of said shaft central portion adjacent the other central nonmagnetic insert;

adjusting the clearance between said shaft and said central inserts to a predetermined value and adjusting the clearance between adjacent nonmagnetic segments to a predetermined value by machining or shimming the junction of said nonmagnetic segments;

joining said ring halves together;

affixing said central inserts to said shaft;

inserting magnetized permanent magnets into axially extending apertures formed between said shaft faces and the inner faces of said half rings; and securing end rings at either axial end of said pole pieces to hold said magnets in their apertures.

2. The method of claim 1 wherein said step of rigidly securing a central nonmagnetic insert between two arcuately shaped sections comprises electron beam welding a central nonmagnetic insert between two laminated arcuately shaped sections.

3. The method of claim 2 wherein said step of rigidly securing a nonmagnetic segment to each end of each of said north and south pole piece sections comprises electron beam welding a nonmagnetic segment to the end of each of said laminated north and south pole piece sections, respectively.

4. The method of claim 1 wherein joining said ring halves comprises bolting each ring halves and affixing said central inserts comprises bolting said central inserts.

5. The method of claim 2 wherein joining said ring halves comprises bolting said ring halves and affixing said central inserts comprises bolting said central inserts.

6. The method of claim 3 wherein joining said ring halves comprises bolting said ring halves and affixing said central inserts comprises bolting said central inserts.

* * * * *